(12) United States Patent
Lee et al.

(10) Patent No.: US 10,277,045 B2
(45) Date of Patent: Apr. 30, 2019

(54) ELECTRONIC DEVICE CHARGER

(71) Applicants: SOLTEAM ELECTRONICS (DONG GUAN) CO., LTD., Dong Guan/Guang Dong (CN); SOLTEAM ELECTRONICS (SU ZHOU) CO., LTD., Wu Jiang/Jiang Su (CN); SOLTEAM ELECTRONICS CO., LTD., Taoyuan (TW)

(72) Inventors: Ping-Lung Lee, New Taipei (TW); Wei-Cheng Chen, Taoyuan (TW); Jen-Tseng Huang, Taoyuan (TW); Chin-Cheng Lu, Taoyuan (TW)

(73) Assignees: SOLTEAM ELECTRONICS (DONG GUAN) CO., LTD. (CN); SOLTEAM ELECTRONICS (SU ZHOU) CO., LTD. (CN); SOLTEAM ELECTRONICS CO., LTD. (TW)

( * ) Notice: Subject to any disclaimer, the term of this patent is extended or adjusted under 35 U.S.C. 154(b) by 0 days.

(21) Appl. No.: 15/668,826

(22) Filed: Aug. 4, 2017

(65) Prior Publication Data

US 2018/0212448 A1    Jul. 26, 2018

(30) Foreign Application Priority Data

Jan. 26, 2017    (TW) .............................. 106103121 A

(51) Int. Cl.
*H02J 7/00* (2006.01)
*H02J 7/14* (2006.01)
(Continued)

(52) U.S. Cl.
CPC ............ *H02J 7/0045* (2013.01); *B60L 1/006* (2013.01); *B60L 58/10* (2019.02); *H02J 7/0026* (2013.01);
(Continued)

(58) Field of Classification Search
USPC ................. 320/107, 101, 134, 135, 108, 114
See application file for complete search history.

(56) References Cited

U.S. PATENT DOCUMENTS 6,589,069 B1 * 7/2003 Liao ....................... H01R 13/72
320/103
6,741,064 B2 * 5/2004 Liu ....................... H02J 7/0042
307/64

(Continued)

*Primary Examiner* — Alexis B Pacheco

(57) ABSTRACT

The present invention discloses an electronic device charger, mainly comprising: a voltage converting module, a microprocessor, a low voltage detecting unit, and an over voltage sensing unit. When a rated output voltage of a vehicle battery of an electric vehicle is detected to be lower than a first threshold voltage by the low voltage detecting unit or found to be higher than a second threshold voltage by the over voltage sensing unit, the microprocessor immediately stops the vehicle battery providing electrical power to at least one portable electronic device owned by the driver of the electric vehicle. Therefore, the electronic device charger can not only save the energy of the vehicle battery while the vehicle battery is at a low voltage state, but also protect the portable electronic devices from being damaged by the electrical power as the rated output voltage of the vehicle battery exceed a normal voltage level.

6 Claims, 6 Drawing Sheets

(51) Int. Cl.
*B60L 1/00* (2006.01)
*B60L 58/10* (2019.01)
(52) U.S. Cl.
CPC .......... *H02J 7/0027* (2013.01); *H02J 7/0054* (2013.01); *B60L 2240/461* (2013.01); *B60L 2240/527* (2013.01); *B60L 2240/54* (2013.01); *B60L 2260/26* (2013.01); *H02J 7/0013* (2013.01); *H02J 7/0042* (2013.01); *Y02T 10/7005* (2013.01)

(56) References Cited

U.S. PATENT DOCUMENTS

| | | | |
|---|---|---|---|
| 8,149,570 B2 * | 4/2012 | Keebler | H02J 7/0055 307/11 |
| 2008/0061739 A1 * | 3/2008 | Lu | H02J 7/0042 320/114 |
| 2009/0296442 A1 * | 12/2009 | Chang | H02J 7/0054 363/142 |
| 2009/0309542 A1 * | 12/2009 | Hung | H01R 31/065 320/111 |
| 2012/0261978 A1 * | 10/2012 | Lu | B62M 6/45 301/6.5 |

* cited by examiner

ELECTRONIC DEVICE CHARGER

BACKGROUND OF THE INVENTION

1. Field of the Invention

The present invention relates to the technology field of electric charging devices, and more particularly to an electronic device charger.

2. Description of the Prior Art

Along with the continuous advance of electric motor and battery, nowadays powerful electric scooters exhibiting an sufficient moving speed already have their own selling market differing from traditional two-stroke scooters. FIG. 1 shows a stereo diagram of an electric scooter. It is well known that, the electric scooter 1b is developed to replace the traditional two-stroke scooters for being as a primary short-distance transport vehicle for the commuter according to environmental policies published by government.

On the other hand, FIG. 2 shows a stereo view of an electric personal assistive mobility device (EPAMD), and the EPAMD 1a has become a necessary transportation carrier for the elderly and disabled persons. In spite of the fact that the mechanical structure of the EPAMD 1a is similar to the transitional scooter's, the EPAMD 1a uses an electric motor for generating driving power instead of the internal combustion engine of the transitional scooter. It is worth explaining that, since the EPAMD 1a is equipped with a 24-volt vehicle battery, it must firstly covert a 24-volt power outputted by the vehicle battery to a 5-volt power, such that the 24-volt power outputted by the vehicle battery can be prevented from being used for directly charging at least one portable electronic device owned by the driver of the EPAMD 1a.

Please refer to FIG. 3, there is provided a stereo diagram of a charger for portable electronic devices. As FIG. 3 shows, the charger 1' mainly comprises: a main body 11', an electrical cable 12' and an XLR male connector 13', wherein the XLR male connector 13' is used for being connected to an XLR female connector 1b1 of the electric scooter 1b shown in FIG. 1. Particularly, the main body 11' has a voltage convertor or a voltage regulator; moreover, through the electrical cable 12', the voltage convertor is able to receive a the 24-volt power to a 5-volt voltage, such that the 5-volt voltage is therefore outputted for charging at least one portable electronic device owned by the driver of the electric scooter 1b.

The aforesaid charger 1' for portable electronic devices has also been widely applied in the EPAMD 1a of FIG. 2; however, the charger 1' shows following shortcomings or drawbacks in practice:

(1) The charger 1' does not have a low voltage detection function. Because to make the vehicle battery steadily provide electrical power to a moving EPAMD 1a is extremely important, it must stop vehicle battery providing electrical power to charge the portable electronic devices once the vehicle battery enters a low voltage state due to the insufficiency of the battery capacity.

(2) The charger 1' does not have an over voltage detection function. The EPAMD 1a commonly has an energy recovery system, which is used for charging the vehicle battery while the EPAMD 1a is downhill moving. However, to continuously charge the vehicle battery may cause a rated output voltage of the vehicle battery exceed 24 volt, so as to damage electronic components of the portable electronic devices charged by the charger 1'.

Through above descriptions, it is clear that the conventional charger 1' for portable electronic devices still has many practically-using disadvantages; in view of that, the inventors of the present application have made great efforts to make inventive research thereon and eventually provided an electronic device charger.

SUMMARY OF THE INVENTION

The primary objective of the present invention is to provide an electronic device charger having functions of low voltage detection and over voltage sense. This electronic device charger mainly comprises: a voltage converting module, a microprocessor, a low voltage detecting unit, and an over voltage sensing unit. When a rated output voltage of a vehicle battery of an electric vehicle is detected to be lower than a first threshold voltage by the low voltage detecting unit or found to be higher than a second threshold voltage by the over voltage sensing unit, the microprocessor immediately stops the vehicle battery providing electrical power to at least one portable electronic device owned by the driver of the electric vehicle. Therefore, the electronic device charger can not only save the energy of the vehicle battery while the vehicle battery is at a low voltage state, but also protect the portable electronic devices charged by the vehicle battery from being damaged by the electrical power as the rated output voltage of the vehicle battery exceed a normal voltage level.

In order to achieve the primary objective of the present invention, the inventor of the present invention provides an embodiment for the electronic device charger, which is applied in an electric vehicle for charging at least one electronic device, and comprises:

a first electrical connector, being used for connecting to a vehicle battery of the electric vehicle;

a plurality of second electrical connectors;

a power converter, being electrically connected to the first electrical connector for receiving a first power with a first voltage outputted by the vehicle battery, so as to convert the first power to a second power with a second voltage; moreover, the power converter also being electrically connected to the second electrical connector for outputting the second power to the electronic device through the second electrical connector; wherein the first voltage is higher than the second voltage, and the power converter comprising;

a voltage conversion module, being electrically connected to the first electrical connector and the second electrical connector;

a microprocessor, being electrically connected to a power switch of the voltage conversion module;

a low voltage detecting unit, being electrically connected to the first electrical connector and the microprocessor, and used for determining whether the first voltage is lower than a first threshold voltage or not; and an over voltage detecting unit, being electrically connected to the first electrical connector and the microprocessor, and used for determining whether the first voltage is higher than a second threshold voltage or not;

wherein when the first voltage is detected to be lower than the first threshold voltage by the low voltage detecting unit or found to be higher than the second threshold voltage by the over voltage detecting unit, the microprocessor immediately stopping the vehicle battery providing the second power to the electronic device.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a electronic device charger according to the present invention, embodiments of the present invention will be described in detail with reference to the attached drawings hereinafter.

Figure 4:
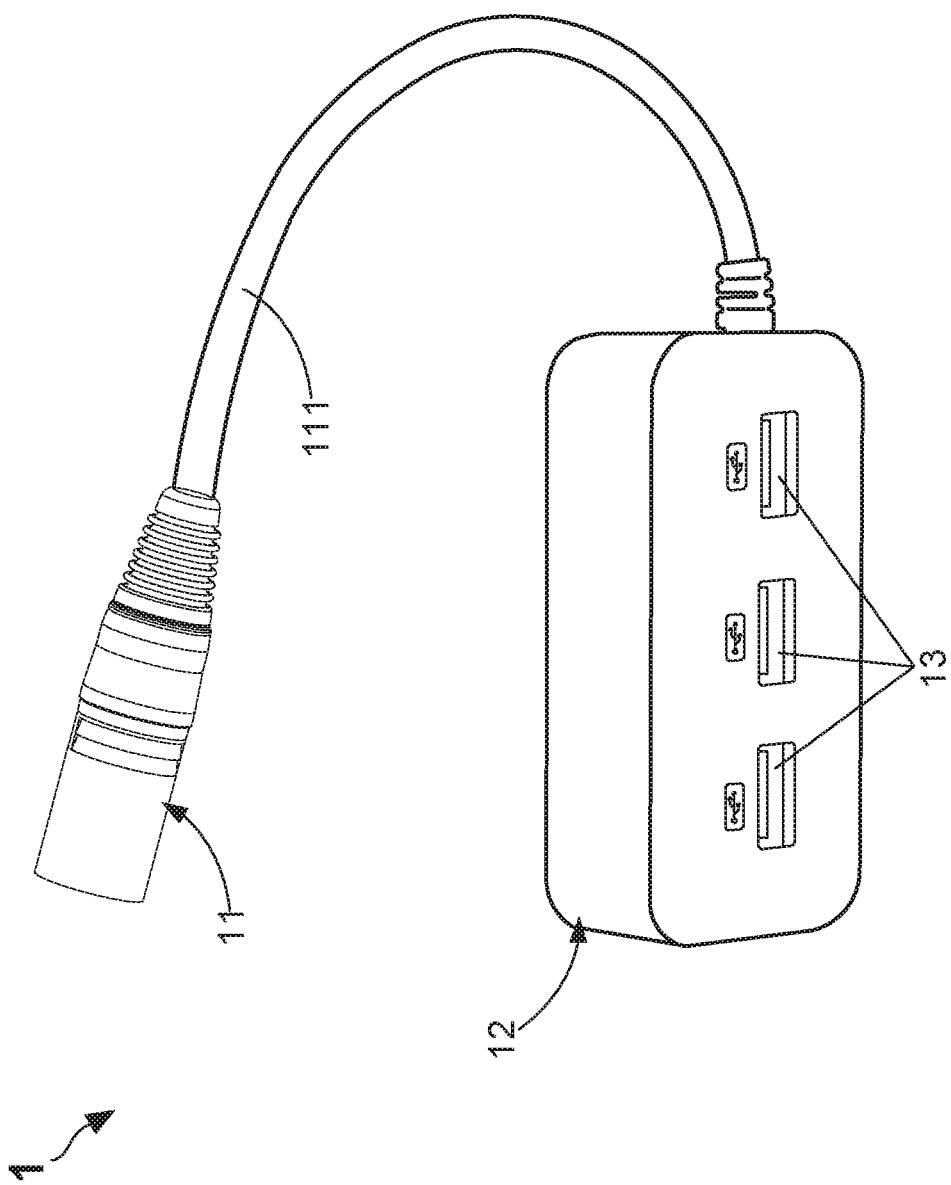
FIG. 4 shows a first stereo diagram of an electronic device charger according to the present invention.
Figure 5:
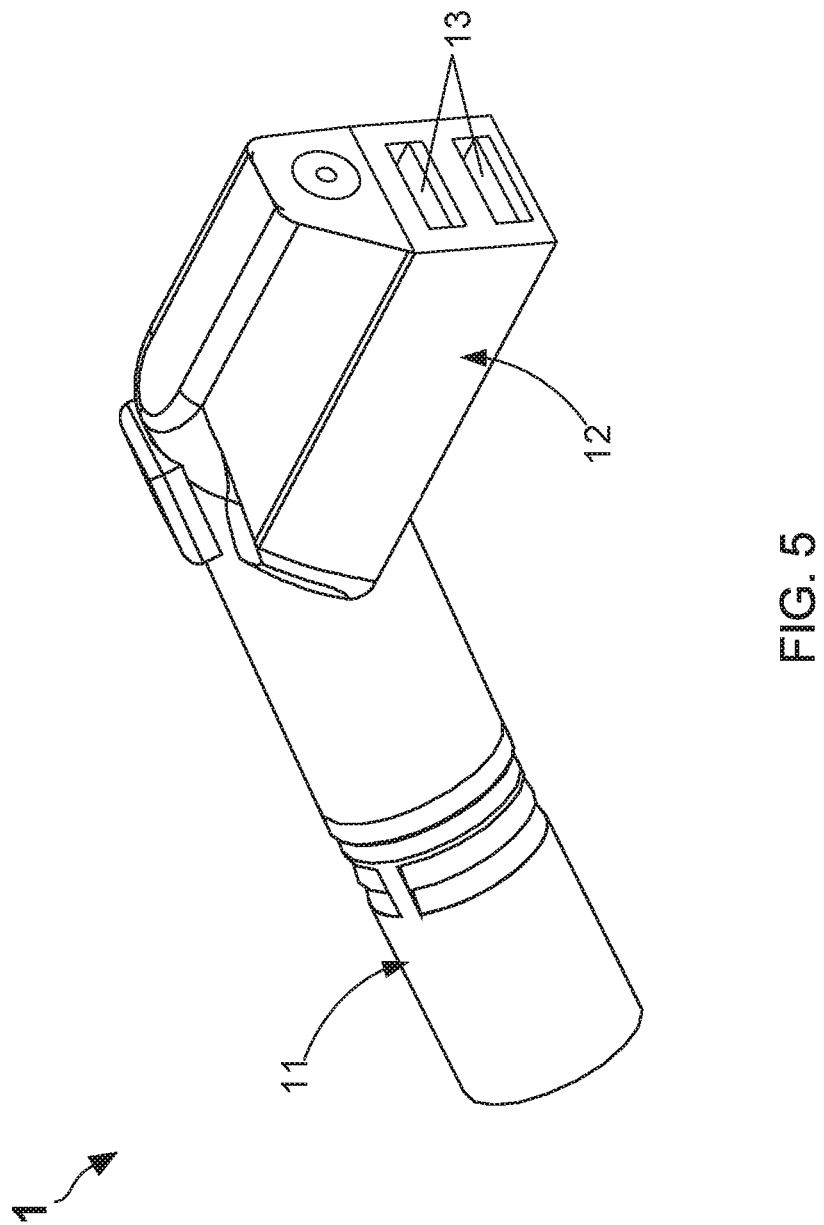
FIG. 5 shows a second first stereo diagram of the electronic device charger according to the present invention.

With reference to FIG. 4, there is provided a first stereo diagram of an electronic device charger according to the present invention. As FIG. 4 shows, the electronic device charger 1 mainly comprises: a first electrical connector 11, a power converter 12 and a plurality of second electrical connectors 13, wherein the first electrical connector 11 is used for connecting to a vehicle battery of an electric vehicle. It must emphasizes that, although FIG. 4 indicates that the first electrical connector 11 is electrically connected to the power converter 12 via an electrical cable 111, that cannot be regarded as a particular limitation in connection way between the power converter 12 and the first electrical connector 11. For instance, the first electrical connector 11 and the power converter 12 can be integrated together according to a second first stereo diagram of the electronic device charger 1 provided by FIG. 5.

Though the first electrical connector 11, the power converter 12 is able to receive a first power with a first voltage outputted by the vehicle battery, so as to convert the first power to a second power with a second voltage; wherein the first voltage is higher than the second voltage. According to the specific type of the vehicle battery, the said first voltage may be 24 volt, 36 volt, 48 volt, or 54 volt. It is worth explaining that, through the second electrical connector 13, the second power is outputted by the power converter 12 for charging at least one portable electronic device owned by a driver of the electric vehicle, so that the second power may be 5 volt, 3.3 volt or 1.8 volt.

Figure 6:
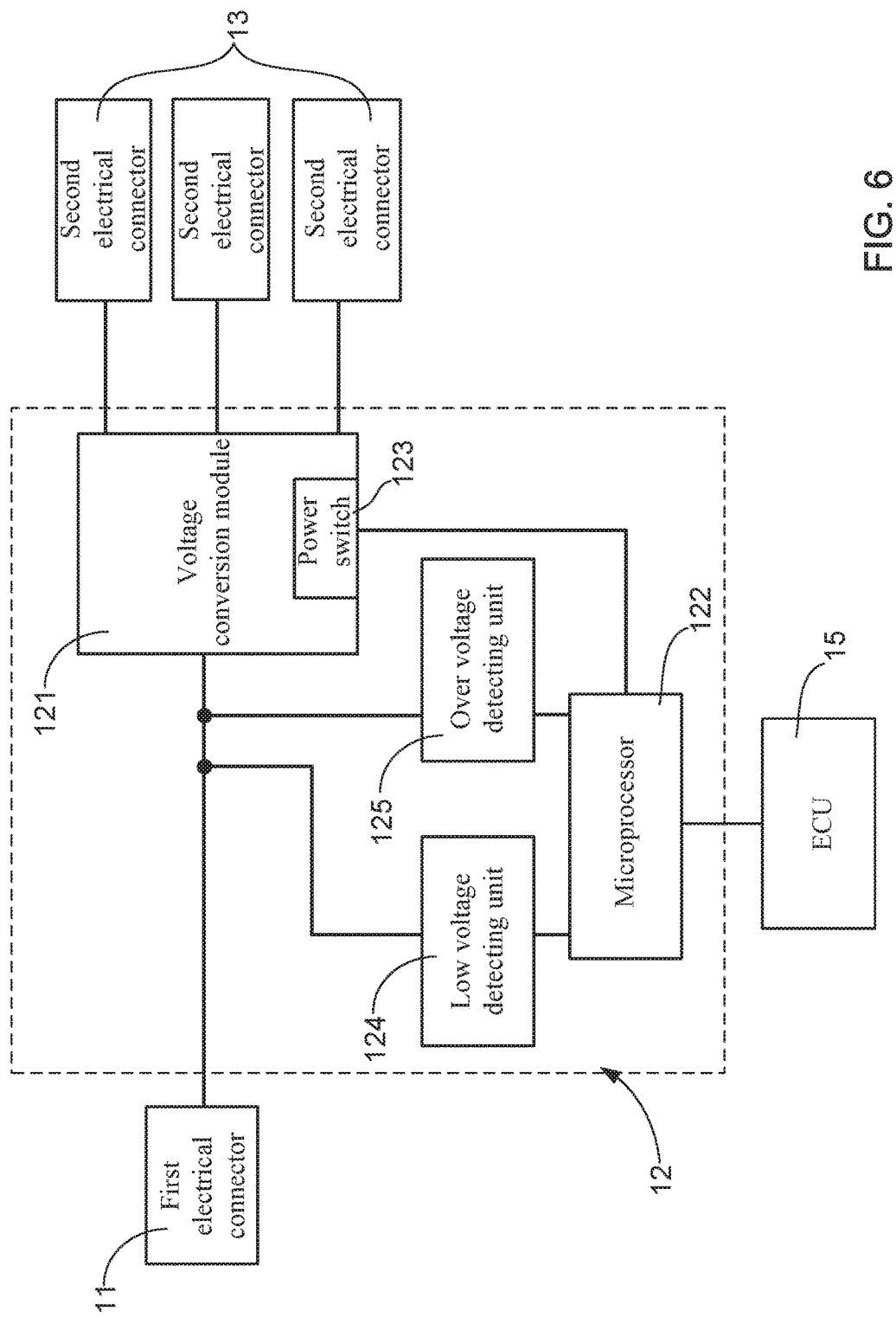
FIG. 6 shows a circuit block diagram of the electronic device charger.

Continuously referring to FIG. 4 and please simultaneously refer to FIG. 6, wherein FIG. 6 shows a circuit block diagram of the electronic device charger. As FIG. 4 and FIG. 6 show, the power converter 12 comprises: a voltage conversion module 121, a microprocessor 122, a low voltage detecting unit 124, and an over voltage detecting unit 125, wherein the microprocessor 122 is electrically connected to the low voltage detecting unit 124 and the over voltage detecting unit 125, and also electrically connected to a power switch 123 of the voltage conversion module 121. In the present invention, the low voltage detecting unit 124 is electrically connected to the first electrical connector 11 and the microprocessor 122 for determining whether the first voltage is lower than a first threshold voltage or not. On the other hand, the over voltage detecting unit 125 is electrically connected to the first electrical connector 11 and the microprocessor 122 for determining whether the first voltage is higher than a second threshold voltage or not.

Particularly, when the first voltage is detected to be lower than the first threshold voltage by the low voltage detecting unit 124 or found to be higher than the second threshold voltage by the over voltage detecting unit 125, the microprocessor 122 immediately stopping the vehicle battery providing the second power to the electronic device. It needs to further explain that. Since the electric vehicle is commonly installed with an energy recovery system for charging the vehicle battery while the electric vehicle is downhill moving, the over voltage detecting unit 125 is adopted for monitoring whether a rated output voltage of the vehicle battery exceed a normal voltage level or not. Therefore, once the rated output voltage of the vehicle battery is found exceeding the normal voltage level, the microprocessor 122 immediately stops the vehicle battery providing the second power to the portable electronic device, so as to protect the portable electronic devices from being damaged by the electrical power.

On the contrary, when the electric vehicle is at a lane-climbing state, over-high power consumption of an electric motor of the electric vehicle may cause the rated output voltage of the vehicle battery be lower than 20 volt. In the meantime, the microprocessor would also 122 stops the voltage conversion module 122 outputting the second power by turning off the power switch 123. It is worth explaining that, according to the specific type of the vehicle battery, the second threshold can be set to be 24 volt, 36 volt, 48 volt, or 54 volt. Moreover, the first threshold voltage is calculated by making the second threshold voltage be multiplied by a specific percentage in a range from 70% to 80%.

In addition, FIG. 6 also indicates that the microprocessor 122 can be electrically connected to an electronic control unit (ECU) 15 of the electric vehicle, such that the microprocessor 122 is able to evaluate that the electric vehicle is at a lane-climbing state, a downhill-moving state or a ground-moving state after analyzing at least one data of wheel rotation speed provided by the electronic control unit 15. For instance, when the electric vehicle is at the lane-climbing state as well as the first voltage is lower than the first threshold voltage, the microprocessor 122 would stops the voltage conversion module 121 outputting the second power by turning off the power switch 123. On the other hand, when the electric vehicle is at the downhill-moving state as well as the first voltage is higher than the second threshold voltage, the microprocessor 122 would stops the voltage conversion module 121 outputting the second power by turning off the power switch 123. However, it needs to further explain that, when the electric vehicle is at the ground-moving state, the low voltage state is configured for monitoring a battery capacity of the vehicle battery, such that the microprocessor 122 is able to stops the power outputting of the voltage conversion module 121 while the battery capacity is found to be insufficient.

Figure 1:
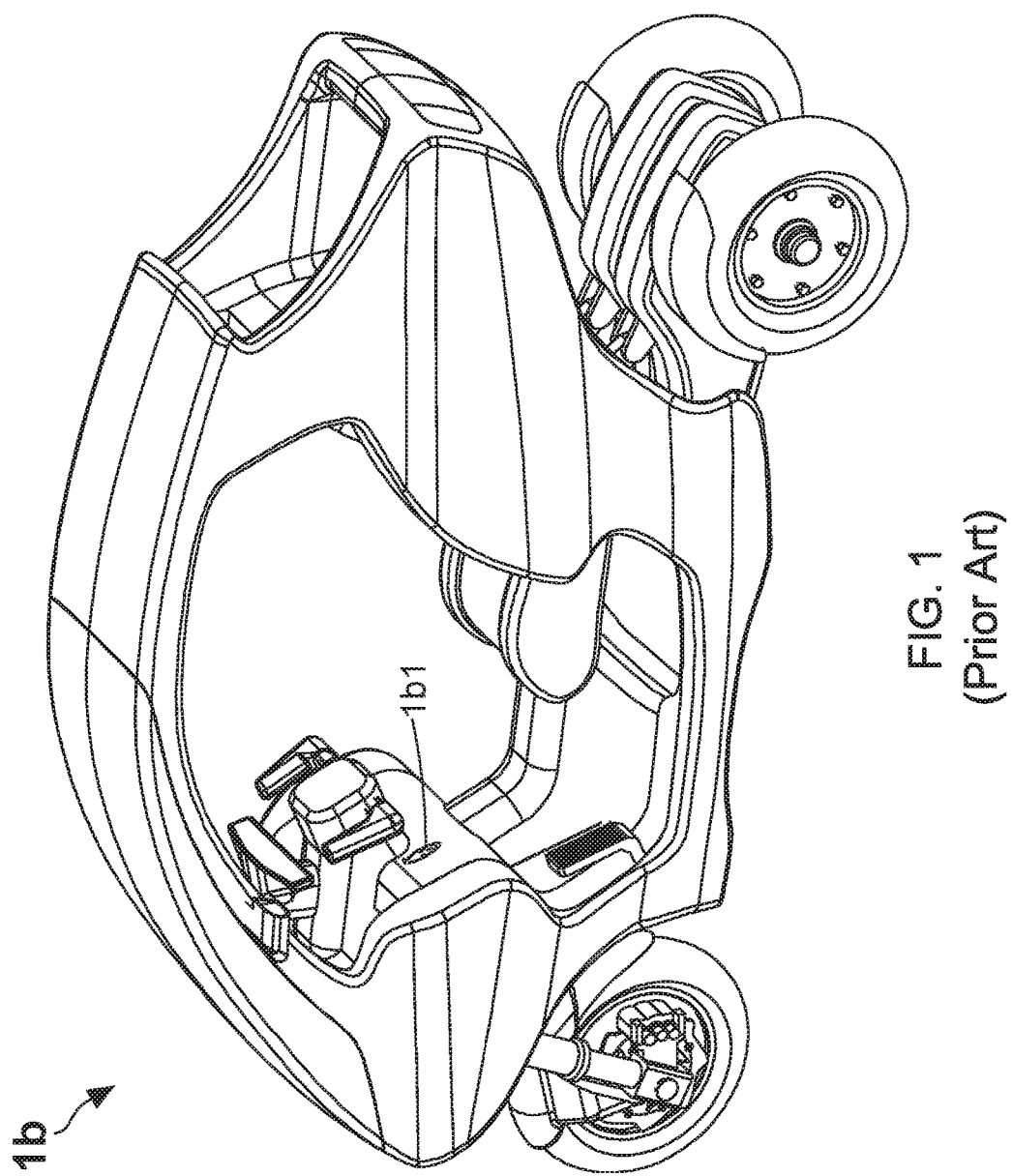
FIG. 1 shows a stereo diagram of an electric scooter.
Figure 2:
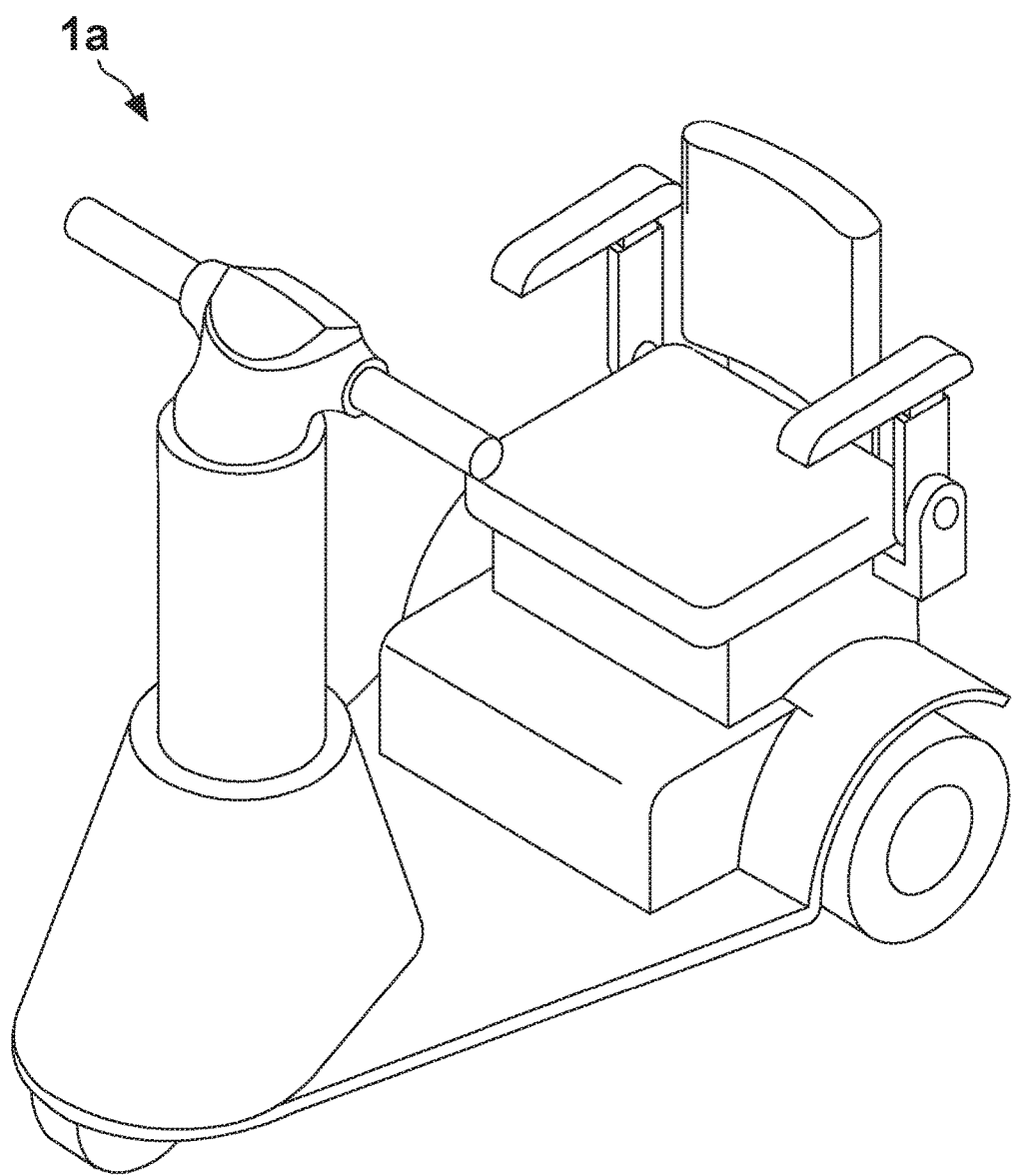
FIG. 2 shows a stereo view of an electric personal assistive mobility device (EPAMD)
Figure 3:
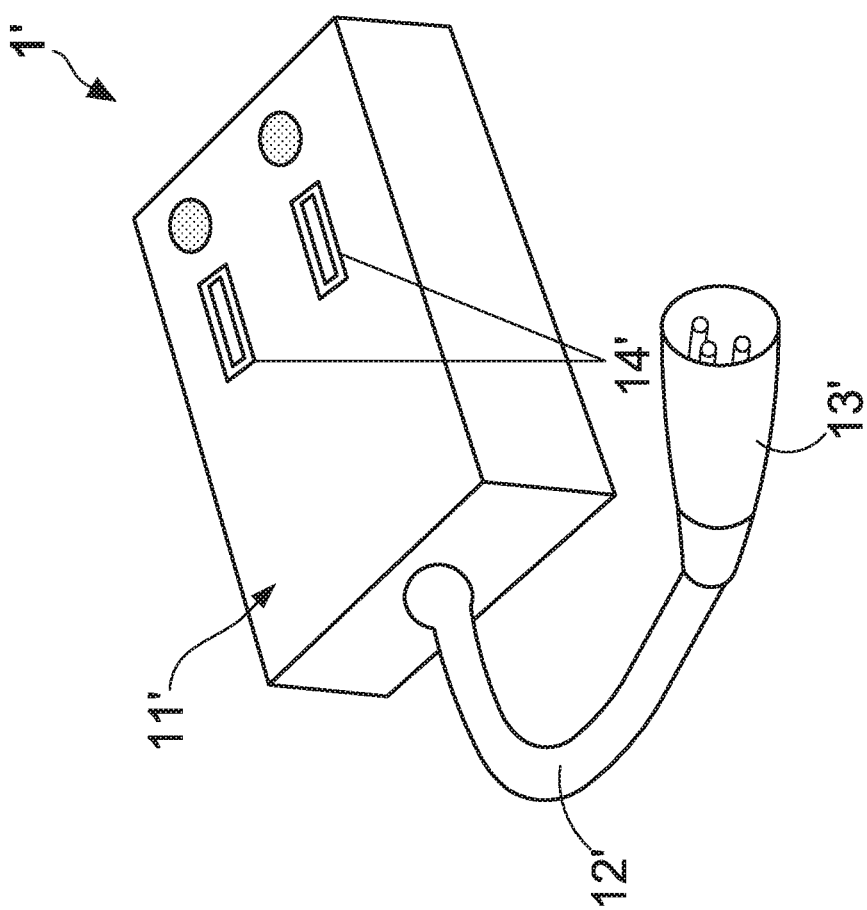
FIG. 3 shows a stereo diagram of a charger for portable electronic devices.

Therefore, through above descriptions, the electronic device charger of the present invention has been introduced completely and clearly; in summary, the present invention includes the advantages of:

(1) Differing from the fact that the conventional charger 1' for portable electronic devices (shown as FIG. 3) lacks functions of low voltage detection and over voltage detection, the present invention particularly discloses an electronic device charger 1 for replacing the conventional charger 1'. This electronic device charger mainly comprises: a first electrical connector 11, a voltage conversion module 121, a microprocessor 122, a low voltage detecting unit 124, an over voltage detecting unit 125, and a plurality of second electrical connectors 13. According the particular design of the present invention, when a rated output voltage of a vehicle battery of an electric vehicle is detected to be lower than a first threshold voltage by the low voltage detecting unit 124 or found to be higher than a second threshold voltage by the over voltage detecting unit 125, the microprocessor 122 immediately stops the vehicle battery providing electrical power to at least one portable electronic device owned by the driver of the electric vehicle. Obviously, this electronic device charger 1 can not only save the energy of the vehicle battery while the vehicle battery is at a low voltage state, but also protect the portable electronic devices from being damaged by the electrical power as the rated output voltage of the vehicle battery exceed a normal voltage level.

The above description is made on embodiments of the present invention. However, the embodiments are not intended to limit scope of the present invention, and all equivalent implementations or alterations within the spirit of the present invention still fall within the scope of the present invention.

What is claimed is:

1. An electronic device charger, being applied in an electric vehicle for charging at least one electronic device, and comprising:
   a first electrical connector, being used for connecting to a vehicle battery of the electric vehicle;
   a plurality of second electrical connectors;
   a power converter, being electrically connected to the first electrical connector for receiving a first power with a first voltage outputted by the vehicle battery, so as to convert the first power to a second power with a second voltage; wherein the first voltage is higher than the second voltage, and the power converter also being electrically connected to the second electrical connector for outputting the second power to the electronic device through the second electrical connector; and wherein the power converter comprises:
      a voltage conversion module, being electrically connected to the first electrical connector and the second electrical connector;
      a microprocessor, being electrically connected to a power switch of the voltage conversion module;
      a low voltage detecting unit, being electrically connected to the first electrical connector and the microprocessor, and used for determining whether the first voltage is lower than a first threshold voltage or not; and
      an over voltage detecting unit, being electrically connected to the first electrical connector and the microprocessor, and used for determining whether the first voltage is higher than a second threshold voltage or not;
   wherein when the first voltage is detected to be lower than the first threshold voltage by the low voltage detecting unit or found to be higher than the second threshold voltage by the over voltage detecting unit, the microprocessor immediately stopping the vehicle battery providing the second power to the electronic device;
   wherein the microprocessor is further electrically connected to an electronic control unit (ECU) of the electric vehicle, so as to evaluate that the electric vehicle is at a lane-climbing state, a downhill-moving state or a ground-moving state after analyzing at least one data of wheel rotation speed provided by the electronic control unit;
   wherein the microprocessor is configured to stop the voltage conversion module outputting the second power by turning off the power switch in the case of the electric vehicle being at the downhill-moving state as well as the first voltage is higher than the second threshold voltage.

2. The electronic device charger of claim 1, wherein the first voltage is selected from the group consisting of 24 volt, 36 volt, 48 volt, and 54 volt.

3. The electronic device charger of claim 1, wherein the second voltage is selected from the group consisting of 5 volt, 3.3 volt and 1.8 volt.

4. The electronic device charger of claim 1, wherein the second threshold voltage is selected from the group consisting of 24 volt, 36 volt, 48 volt, and 54 volt.

5. The electronic device charger of claim 1, wherein the first threshold voltage is calculated by making the second threshold voltage be multiplied by a specific percentage in a range from 70% to 80%.

6. The electronic device charger of claim 1, wherein when the electric vehicle is at the lane-climbing state as well as the first voltage is lower than the first threshold voltage, the microprocessor stopping the voltage conversion module outputting the second power by turning off the power switch.

* * * * *